US007519563B1

(12) United States Patent
Urmanov et al.

(10) Patent No.: US 7,519,563 B1
(45) Date of Patent: Apr. 14, 2009

(54) OPTIMIZING SUBSET SELECTION TO FACILITATE PARALLEL TRAINING OF SUPPORT VECTOR MACHINES

(75) Inventors: Aleksey M. Urmanov, San Diego, CA (US); Anton A. Bougaev, West Lafayette, IN (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 391 days.

(21) Appl. No.: 11/053,385

(22) Filed: Feb. 7, 2005

(51) Int. Cl.
*G06F 15/18* (2006.01)
*G05B 13/02* (2006.01)

(52) U.S. Cl. .............................. 706/12; 700/31; 700/44
(58) Field of Classification Search .................... 703/2; 700/31, 44; 706/12, 20
See application file for complete search history.

(56) References Cited

U.S. PATENT DOCUMENTS 7,117,188 B2 * 10/2006 Guyon et al. ................. 706/20

2002/0095260 A1 * 7/2002 Huyn ........................... 702/19

* cited by examiner

*Primary Examiner*—Joseph P. Hirl
*Assistant Examiner*—Kalpana Bharadwaj
(74) *Attorney, Agent, or Firm*—Park, Vaughan & Fleming LLP

(57) ABSTRACT

One embodiment of the present invention provides a system that optimizes subset selection to facilitate parallel training of a support vector machine (SVM). During operation, the system receives a dataset comprised of data points. Next, the system evaluates the data points to produce a class separability measure, and uses the class separability measure to partition the data points in the dataset into N batches. The system then performs SVM training computations on the N batches in parallel to produce support vectors for each of the N batches. Finally, the system performs a final SVM training computation using an agglomeration of support vectors computed for each of the N batches to obtain a substantially optimal solution to the SVM training problem for the entire dataset.

17 Claims, 11 Drawing Sheets

OPTIMIZING SUBSET SELECTION TO FACILITATE PARALLEL TRAINING OF SUPPORT VECTOR MACHINES

BACKGROUND

The present invention relates to computer-based classification techniques, which are used to identify members of groups of interest within datasets.

Classification and pattern recognition techniques have wide-reaching applications. A number of life science applications use classification techniques to identify members of groups of interest within clinical datasets. For example, an important life science application is concerned with the classification of the protein signatures of patients who have some type of cancer from those who do not. This problem stems from the need in clinical trials to test the efficacy of a drug in curing cancer while the cancer is at an early stage. In order to do so, one needs to be able to identify patients who have cancer at an early stage.

Conventional diagnosis techniques are not sufficient for this application. A popular technique (from an area that has become known as "proteomics") is to analyze mass spectra, which are produced by a mass spectrometer from serum samples of patients. Depending on the type of cancer, the mass spectra of serum samples can show distinct signatures, which are not immediately visible to the naked eye. Several existing data mining techniques are presently used to distinguish the cancer spectra from the normal ones, such as Naïve Bayes, Decision Trees, Principle-Components-Analysis based techniques, Neural Networks, etc.

However, these existing techniques are characterized by false-alarm and missed-alarm probabilities that are not sufficiently small. This is a problem because false alarms can cause patients to experience anxiety, and can cause them submit to unnecessary biopsies or other procedures, while missed alarms can result in progression of an undetected disease.

Support Vector Machines (SVMs) provide a new approach to pattern classification problems. SVM-based techniques are particularly attractive for the cancer classification problem because SVM-based techniques operate robustly for high-dimensional feature data, unlike other techniques which have resource requirements that are closely coupled with feature dimensions.

However, the application of SVM's in areas involving huge datasets, such as in proteomics, is constrained by extremely high computation cost, in terms of both the compute cycles needed as well as enormous physical memory requirements. For large datasets, which are not unusual in most life sciences problems, a quadratic optimization problem that arises during the training phase of the SVM's requires that one be able keep in the memory an N×N matrix, where N is the number of data vectors. This presents huge challenges for conventional high-end enterprise computer servers when the input datasets contain thousands or tens of thousands of data vectors. In addition, the training time for the algorithm grows in a manner that is polynomial in N. Current state-of-the-art research papers propose using heuristic, data-level decomposition approaches; but often these heuristic approaches are designed with little or no quantitative justification and suboptimal results.

SUMMARY

One embodiment of the present invention provides a system that optimizes subset selection to facilitate parallel training of a support vector machine (SVM). During operation, the system receives a dataset comprised of data points. Next, the system evaluates the data points to produce a class separability measure, and uses the class separability measure to partition the data points in the dataset into N batches. The system then performs SVM training computations on the N batches in parallel to produce support vectors for each of the N batches. Finally, the system performs a final SVM training computation using an agglomeration of support vectors computed for each of the N batches to obtain a substantially optimal solution to the SVM training problem for the entire dataset.

In a variation on this embodiment, after the training process is complete, the system uses the SVM (including parameters produced during the training process and the dataset) to classify a second dataset.

In a further variation, using the SVM to classify the second dataset involves using a kernel function to map the second dataset from a low-dimensional input space to a higher-dimensional feature space. The system then performs a quadratic optimization operation, which generates a substantially optimal decision surface in the feature space, wherein the decision surface classifies vectors in the second dataset.

In a variation on this embodiment, the class separability measure J represents the ratio of: traces between class scatter matrices $tr(S_B)$; and traces within class scatter matrices $tr(S_W)$, whereby $$J = \frac{tr(S_R)}{tr(S_W)}.$$

In a further variation, the number of traces between class scatter matrices is calculated as, $$tr(S_B^\Phi) = \sum_{i=1}^{c} n_i \left[ \frac{\text{Sum}(K_{D_i,D_i})}{n_i^2} - 2\frac{\text{Sum}(K_{D_i,D})}{n_i n} + \frac{(K_{D,D})}{n^2} \right],$$

wherein D represents the dataset, $D_i$ represents batch i of D, K represents a kernel matrix, n is the size of the dataset D, and $n_i$ is the size of batch i.

In a further variation, the number of within class scatter matrices, $tr(S_W)$, is calculated as, $$tr(S_W^\Phi) = \sum_{i=1}^{c} \sum_{j=1}^{n_j} \left[ K(x_{i,j}, x_{i,j}) - 2\frac{\text{Sum}(K_{D_i,D_i})}{n_i} \right],$$

wherein D represents the dataset, $D_i$ represents batch i of D, K represents a kernel matrix, n is the size of the dataset D, and $n_i$ is the size of batch i.

In a variation on this embodiment, the class separability measure J is correlated with a support vector yield (SVY), which is the ratio of: the number of: support vectors in a sub-problem solution that are in the solution of the original problem; and the number of support vectors in the solution of the original problem.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Multiprocessor System

Figure 1:
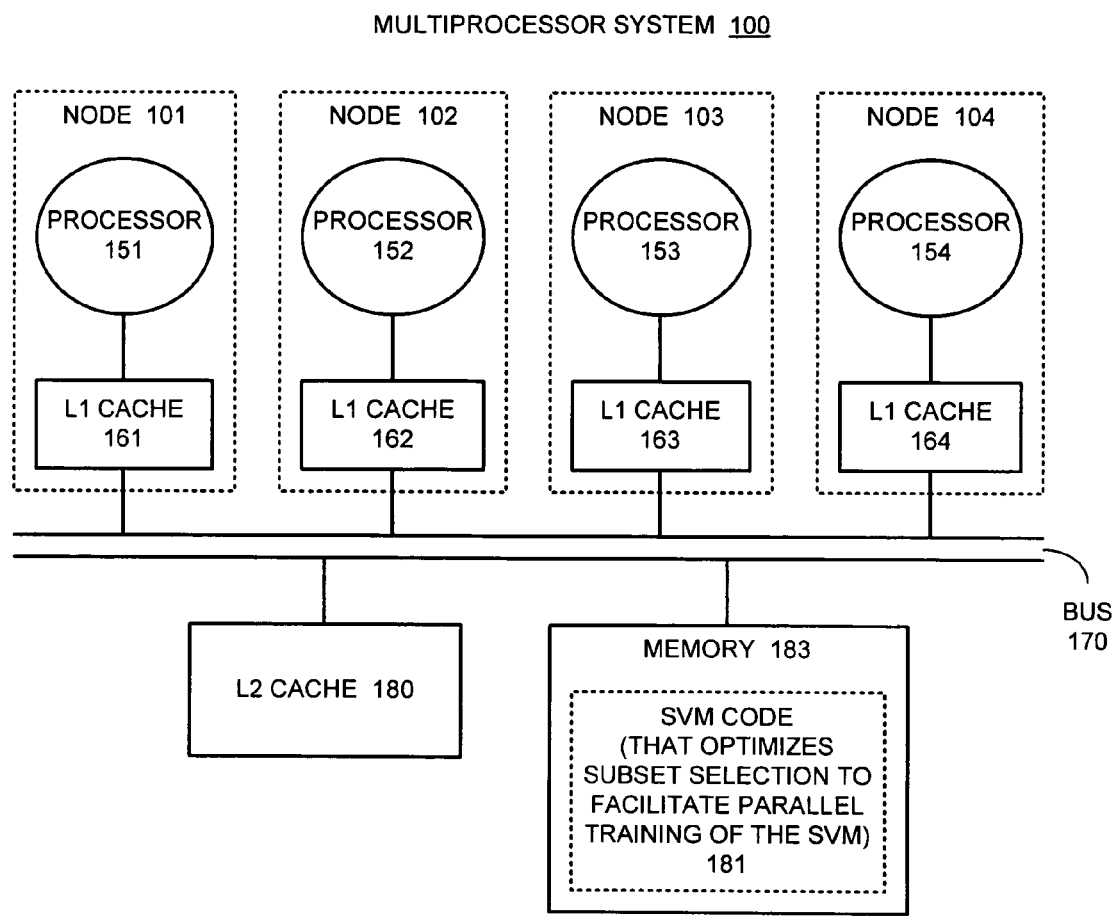
FIG. 1 illustrates a multiprocessor system in accordance with an embodiment of the present invention.

FIG. 1 illustrates an exemplary multiprocessor system 100 in accordance with an embodiment of the present invention. Multiprocessor system 100 is a shared-memory multiprocessor system, which includes a number of processors 151-154 coupled to level one (L1) caches 161-164 which share a level two (L2) cache 180 and a memory 183. Memory 183 contains SVM code that optimizes subset selection to facilitate parallel training of the SVM. This parallel training process is described in more detail below.

During operation, if a processor 151 accesses a data item that is not present in local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

Multiprocessor system 100 also supports a coherency protocol that operates across bus 170. This coherency protocol ensures that if one copy of a data item is modified in L1 cache 161, other copies of the same data item in L1 caches 162-164, in L2 cache 180 and in memory 183 are updated or invalidated to reflect the modification.

Although the present invention is described in the context of the shared-memory multiprocessor system 100, the present invention is not meant to be limited to such a system. In general, the present invention can operate in any computer system or distributed system which contains multiple processors. For example, the present invention can operate in a distributed computing system in which separate computing systems are coupled together through a network. Hence, the term "multiprocessor system," as used in this specification and the appended claims, refers to any computer system or distributed system containing multiple processors which can work together on a given computational task.

Support Vector Machine

Figure 2A:
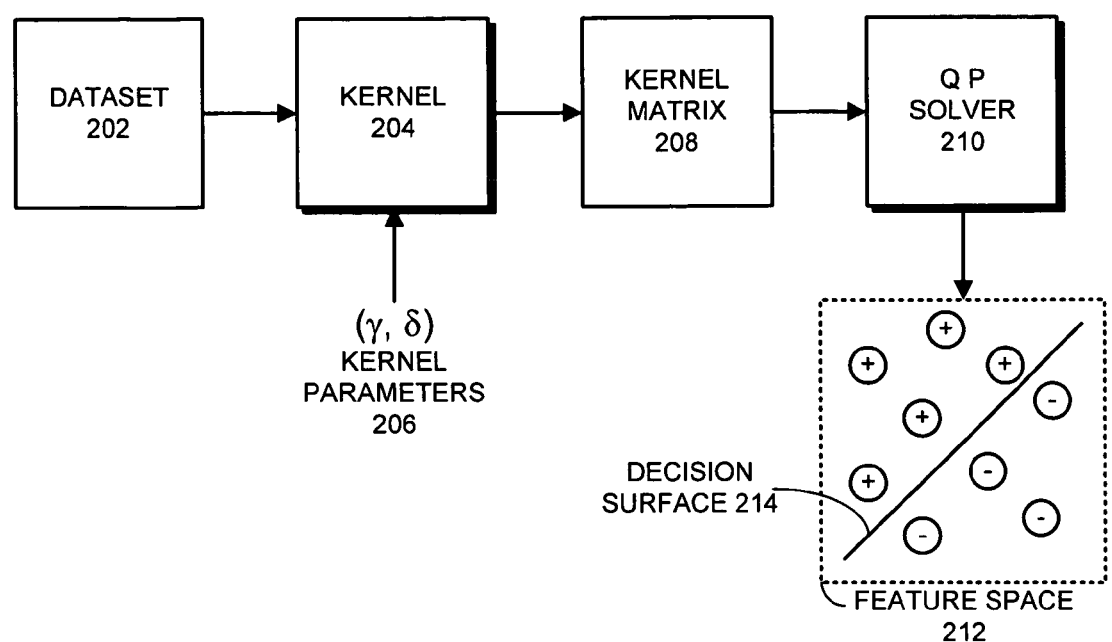
FIG. 2A illustrates how a support vector machine (SVM) operates in accordance with an embodiment of the present invention.
Figure 2B:
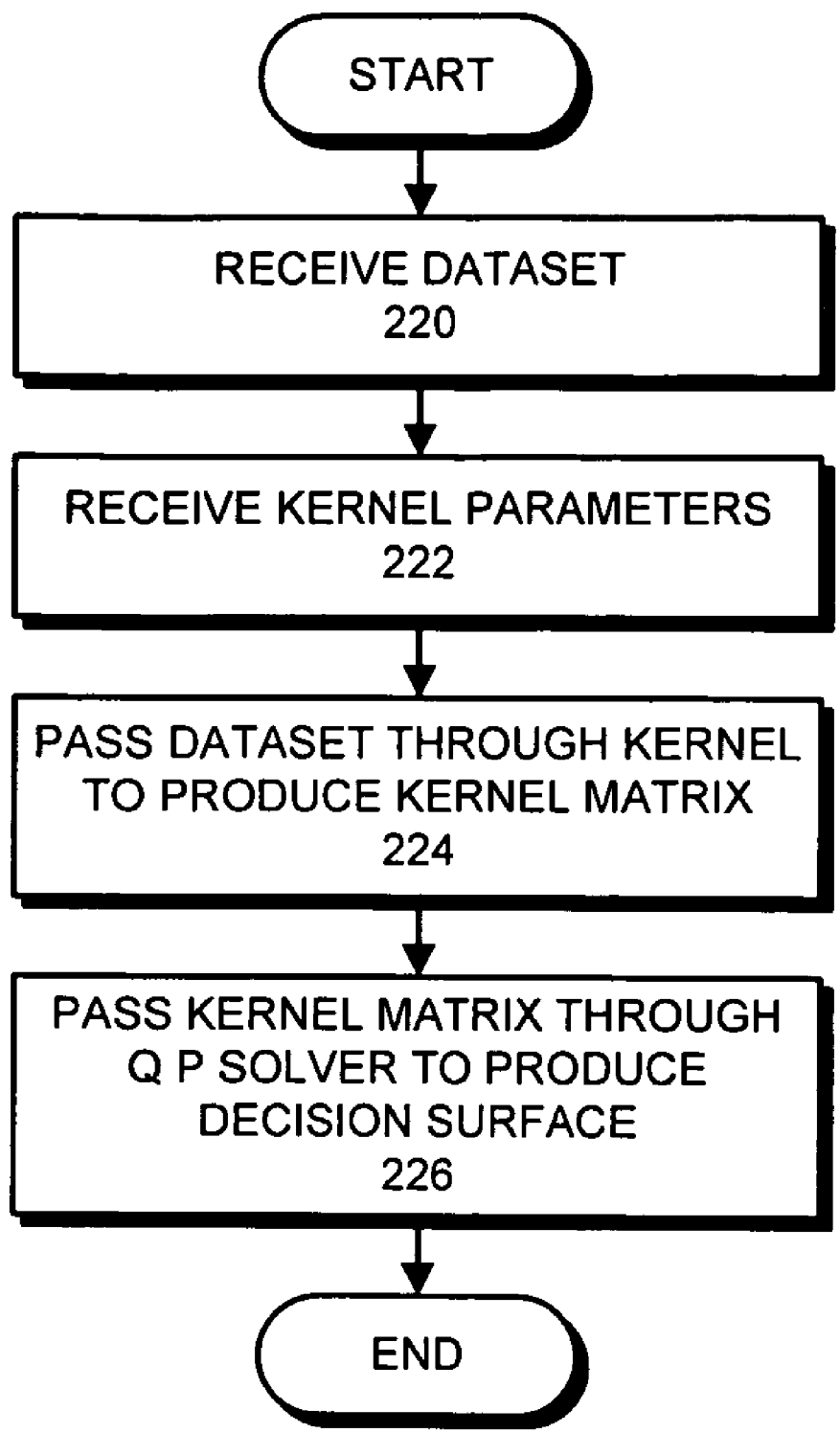
FIG. 2B presents a flow chart illustrating how a support vector machine (SVM) operates in accordance with an embodiment of the present invention.
Figure 3:
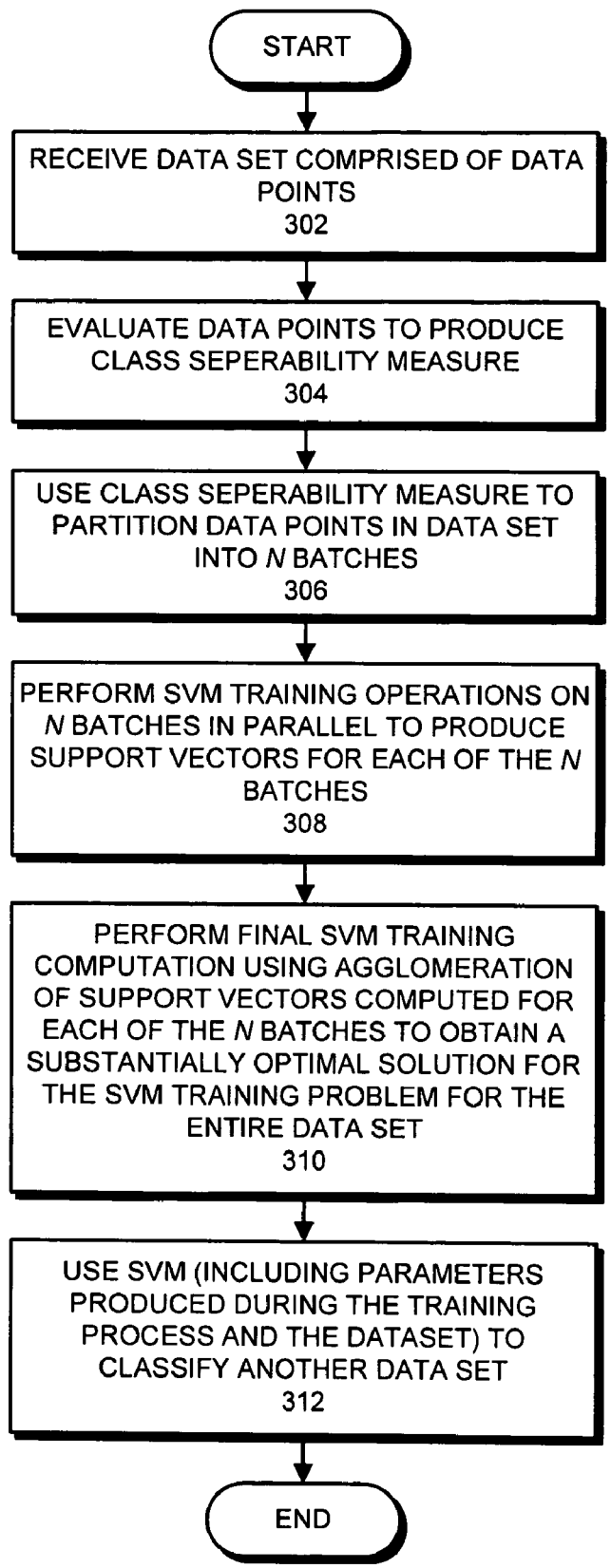
FIG. 3 presents a flow chart illustrating the process of performing a parallel SVM training operation in accordance with an embodiment of the present invention.

FIG. 2A and the flow chart in 2B illustrate how a support vector machine (SVM) operates on a dataset in accordance with an embodiment of the present invention. First, the system receives a dataset 202, for example containing protein signatures for patients who may have cancer (step 220). The system also receives kernel parameters, $\gamma$ and $\delta$ 206 (step 222).

Next, the system passes dataset 202 through kernel 204 to produce a resulting kernel matrix 208 (step 224). This process maps dataset 202 from a low-dimensional input space to a higher-dimensional feature space.

The system then passes kernel matrix 208 through QP solver 210 (step 226), which performs a quadratic optimization operation to produce decision surface 214. Note that decision surface 214 can include a separating hyperplane, which separates members of different groups in feature space 212.

This process is typically performed sequentially on a single-processor machine. However, this single-processor mode of operation has become a limitation. In order to minimize the misclassification probabilities for the SVM, it becomes advantageous to use as many vectors as possible for training the SVM. However, the amount of memory used in representing the kernel matrix for n vectors increases as $O(n^2)$. This quickly consumes the resources on most commercially available machines, and becomes a bottleneck problem with large output spectra from recent, high-resolution mass spectrometers being used with Proteomics.

During the quadratic optimization step operation in step 226, the system attempts to find the optimal separating hyperplane (decision surface) in the feature space using Lagrange multipliers as described below, $$W(\alpha) = \sum_{i=1}^{l} \alpha_i - \frac{1}{2}\sum_{1,j=1}^{l}\alpha_i\alpha_j y_i y_j K(x_i, x_j) \quad (1)$$

under the constraints, $$\sum_{i=1}^{l}\alpha_i y_i = 0,$$

and, $0 \leq \alpha_1 \leq C, i=1, \ldots, 1.$ where, $\alpha_i$ are the Lagrange multipliers, $y_i \in \langle -1,1 \rangle$, $x \in \langle x_1, x_2, \ldots, x_1 \rangle$, where "1" is the number of dimensions, and where $K(x_i,x_j)$ is the kernel function. When the optimal set of $\alpha_i^0$ are found, any test vector x can be classified by evaluating, $$\text{sgn}\left\|\sum_{i=1}^{l}\alpha_i^0 y_i K(x_i, x) + b\right\|.$$

The summation term in equation (1) is equivalent to a matrix multiplication step. For a matrix of size n, matrix multiplication has a complexity of $O(n^3)$, or at best (using Strassen's algorithm) $O(n^{log_2(7)})$. This creates a problem for single-processor machines because it takes an unacceptably long period of time to arrive at a solution for large values of n.

SVMs typically outperform conventional classification techniques such as k-means, neural networks, naïve Bayes, and decision trees by displaying high sensitivity and specificity for categorization of test data. However, they continue to show minor false and missed alarms in their classification. It is desirable to minimize the false and missed alarm cases in the clinical trial qualification process, because misclassification in the patients leads to false/missed alarms for the drug discovery phase too, and thereby incurs further costs on the drug company to conduct extensive trials.

The accuracy of prediction is dependent on the choice of the kernel used in the training step. Most kernel functions have certain input parameters that need to be chosen. One embodiment of the present invention uses a polynomial kernel, which can be defined as follows, $K(x,y) = (\gamma x \cdot y + 1)^\delta$ where x and y are input vectors. The kernel parameters $\gamma$ and $\delta$ are ideally chosen so that the overall sensitivity of the SVM is optimized.

Parallel SVM Training Operation

The present invention provides an innovative technique, which contributes to the speedup, optimal memory utilization, and numerical stability for the solution of a broad class of computational problems important to the life sciences domain. The SVM training procedure (described in Vapnik, V. N., 2000, The Nature of Statistical Learning Theory, Springer-Verlag New York, Inc.) leads to a type of problem called a "quadratic optimization" problem. If the input dataset is large, the solution of the problem becomes intractable on the present generation of high end computer servers. In one embodiment of the present invention, the dataset is split into subsets and each subset is used to train a separate SVM. The result of this split-dataset approach for training is a set of support vectors for each of the separate, subset SVMs. The support vectors for each subset SVM problem are then put together to form a final data subset that is then used to train one final SVM. The solution of the final SVM is a very close approximation to the solution of the original problem. However, the overall compute cycles needed and the memory requirements are substantially smaller in the parallelized case using the optimal dataset partitioning approach described herein.

In general, the original dataset could be partitioned in numerous ways. However, if one does not partition the original dataset with care, the results obtained may not be as good as one would obtain by running the original data through one large SVM computation. One desirable feature of using SVM for classification applications is called "generalization." A pattern recognition technique with poor generalization capability is not of much use. Poor generalization means that, after training, the pattern recognition module will only work with new datasets that contain data patterns that are very close to the patterns in the original training data; but the module may be unable to generalize its predictions to new datasets that contain new data patterns. By contrast, ideal classification algorithms have a capability to learn from a limited set of training data and then generalize the predictions to broader classes of data that were not seen in training. This is called good generalization capability. If one seeks to partition a large dataset into discrete subsets of training data for the purposes of optimizing the training time and memory utilization, the partitioning is ideally done judiciously in a manner that preserves the generalization capability for the SVM algorithm. The present invention is concerned with a novel partitioning method for selecting relevant data subsets in a manner that enables huge SVM problems to be solved in a reasonable solution time on present generations of servers while preserving the good generalization capability of the SVM algorithm.

We introduce here the notion of Support Vector Yield (SVY) to quantify the goodness of any given training data subset. The SVY is defined as the ratio of the number of those support vectors in the sub-problem solution that are in the set of support vectors of the original problem, to the number of vectors in the solution of the original problem.

$$v = \frac{|S(D) \cap S(d_i)|}{|S(D)|} \quad (1)$$

where D is the original (full) dataset, $d_i$ represents the i-th sub-problem's dataset ($d_i$ is a subset of D), S(.) denotes the set of support vectors identified in the solution for given dataset, and $\|$ denotes the number of elements in the set.

The higher the Support Vector Yield for a given $d_i$, the more information about the solution of the original problem this data subset can provide. In practice, it is difficult or impossible to estimate v because the solution of the original problem is not known. The obstacle is that it is impossible to find S(D) for the problems with roughly more than $10^3$ data points in a reasonable time on large servers.

To overcome this challenge our invention exploits the experimental observation that value of the Support Vector Yield is strongly correlated with a class separability measure (i.e., a quantitative measure of how well the SVM classification approach is able to successfully separate members of the distinct classes) in a high dimensional feature space. An important idea in this invention is to associate the goodness of a given partition subset $d_i$ via numerical estimation of the class separability measure. The class separability measure can be evaluated as follows:

$$J = \frac{tr(S_B)}{tr(S_W)} \quad (2)$$

J represents the ratio of traces of within class and between class scatter matrices which are calculated as follows, $$tr(S_B^\Phi) = \sum_{i=1}^{c} n_i \left[ \frac{\text{Sum}(K_{D_i,D_i})}{n_i^2} - 2\frac{\text{Sum}(K_{D_i,D})}{n_i n} + \frac{(K_{D,D})}{n^2} \right] \quad (3)$$

$$tr(S_W^\Phi) = \sum_{i=1}^{c} \sum_{j=1}^{n_i} \left[ K(x_{i,j}, x_{i,j}) - 2\frac{\text{Sum}(K_{D_i,D_i})}{n_i} \right] \quad (4)$$

wherein D represents the dataset, $D_i$ represents batch i of D, K represents a kernel matrix, n is the size of the dataset D, and $n_i$ is the size of batch i.

In fact, the quantities above are quite easy to compute. This approach to data vector partitioning can save an enormous amount of computation for solution of the overall problem. More importantly, this makes problems tractable on present generations of computer servers, and gives insight into the data stricture. All prior-art data-level decompositions of SVM training vectors use heuristic and non-quantifiable characteristics. By contrast, the approach taught herein employs deterministic quantitative method to optimize the data partitioning procedure.

Hence, in one embodiment of the present invention, the process of performing a parallel SVM training operation takes place as follows. First, the system receives a dataset comprised of data points (step 302). Next, the system evaluates the data points (as is described above) to produce a class separability measure (step 304).

Then, as described above, system then uses the class separability measure to partition data points in the data set into N batches (step 306).

Next, the system performs SVM training operations on the N batches in parallel on different processors of a parallel or distributed processing system, which produces support vectors for each of the N batches (step 308).

The system then performs a final SVM training computation using an agglomeration of support vectors computed for each of the N batches. This produces a substantially optimal solution for the SVM training problem for the entire data set (step 310).

After the training process is complete, the system can use the SVM (including parameters produced during the training process and the dataset) to classify another dataset (step 312).

FIRST EXEMPLARY APPLICATION

Figure 4:
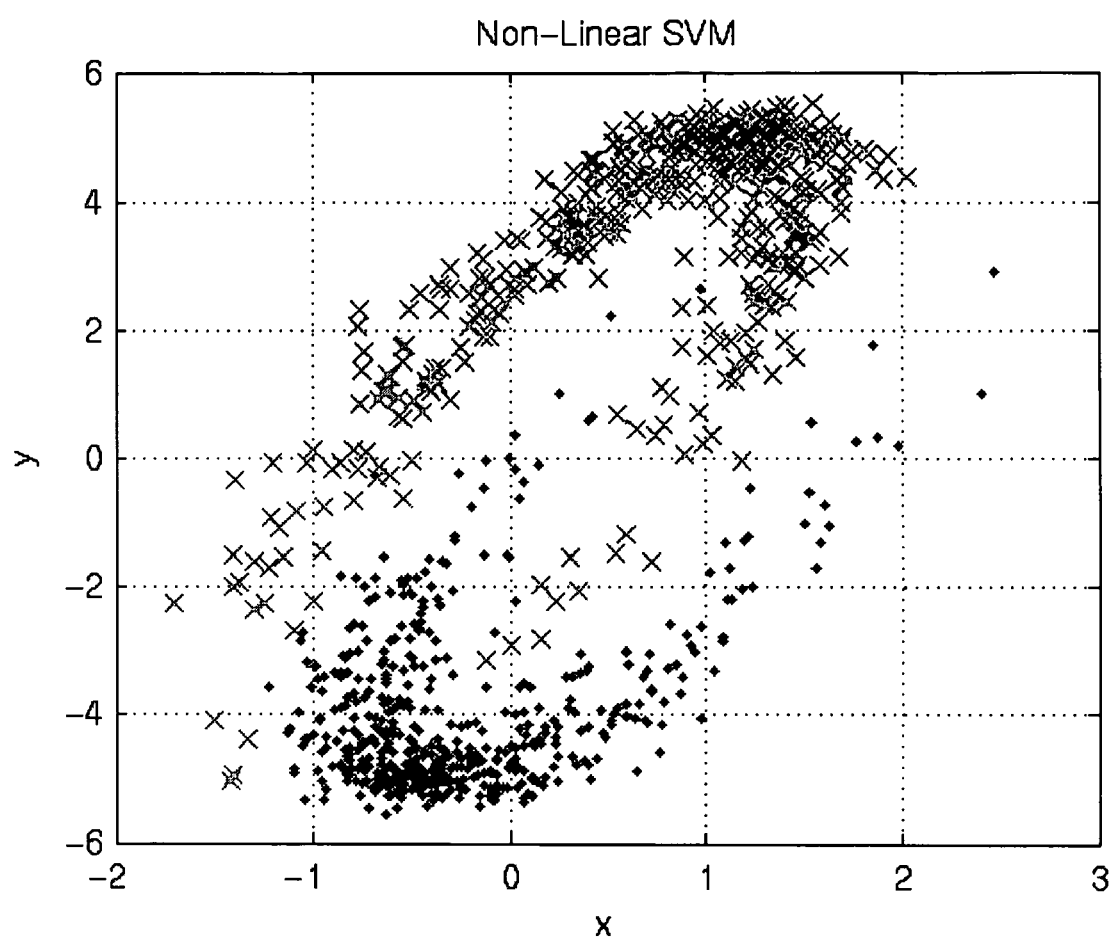
FIG. 4 illustrates a challenging classification problem in accordance with an embodiment of the present invention.

To demonstrate the disclosed method, a large dataset was generated in such a manner that makes it a particularly vexing challenge for classification-type pattern recognition. See FIG. 4 where the objective is to find an optimal separation of the observations represented by "x"s from the observations represented by "diamonds" with minimal miss-identifications. As can be observed in FIG. 4, this is a challenging problem because of the "double horseshoe" relationship between the "x" and diamond observations. Note that naïve approaches that produce a straight line to separate the classes will result in numerous misidentifications.

Figure 5:
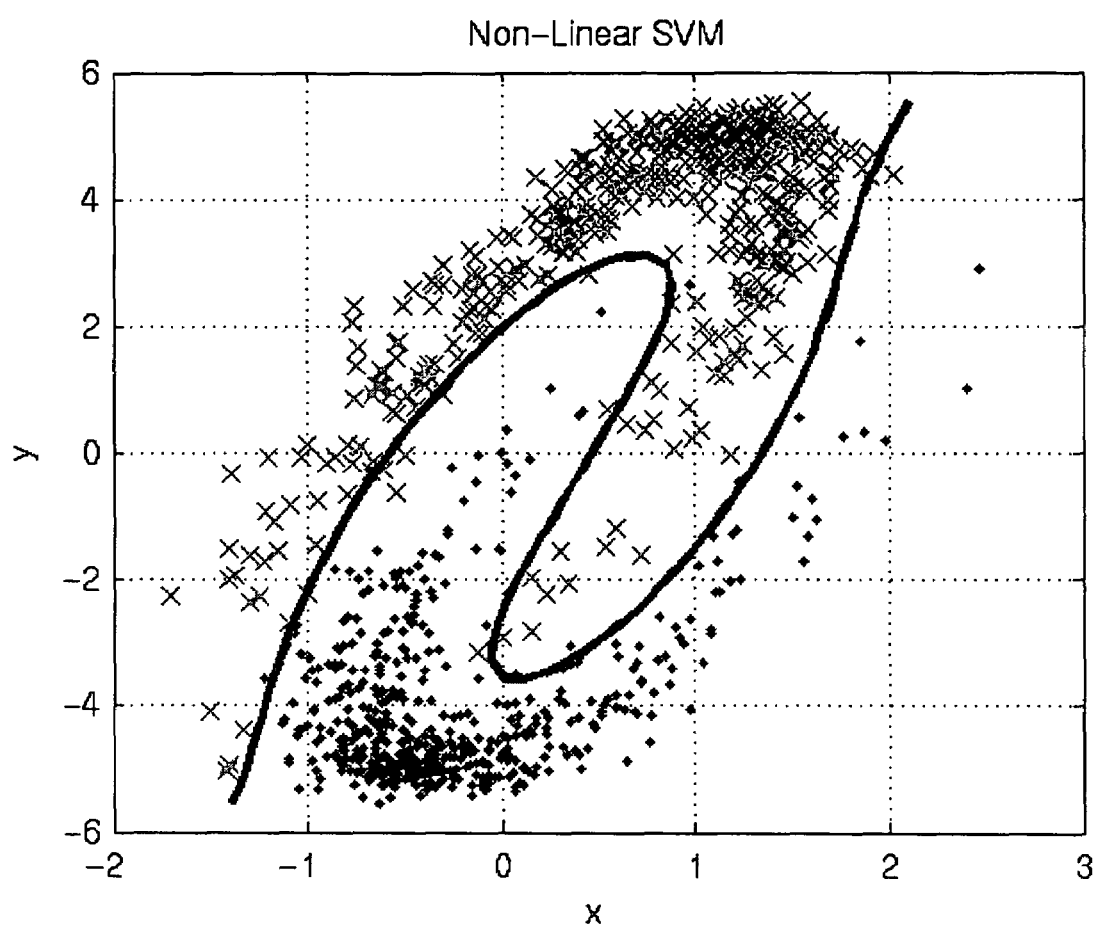
FIG. 5 illustrates an optimal solution to the classification problem illustrated in FIG. 4 accordance with an embodiment of the present invention.

FIG. 5 shows the SVM solution of the entire original problem (wide line separating the "x" and diamond classes). Visual inspection of the solution line in FIG. 5 illustrates why SVM is an excellent approach for classification type pattern recognition. The only problem with using SVM to solve a classification problem like this is the CPU time requirement and the memory requirement.

Figure 6:
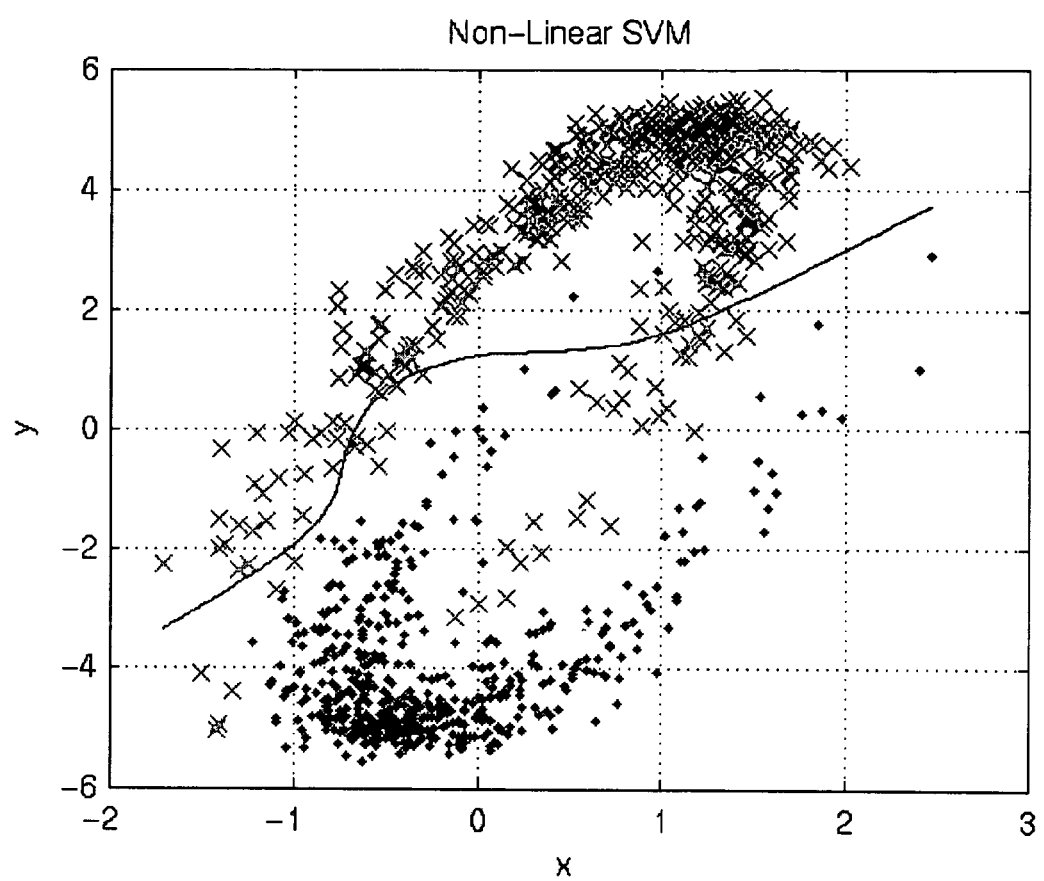
FIG. 6 illustrates a solution obtained for a first partition in accordance with an embodiment of the present invention.

We now partition the original dataset into discrete batches using the Support Vector Yield approach outlined above. The solution of the first sub-problem is shown in FIG. 6. The separation obtained with just one "chunk" of the training data is clearly suboptimal. Nevertheless, we save the support vectors produced during this first pass to be combined with the support vectors from the other, subsequent batches.

Figure 7:
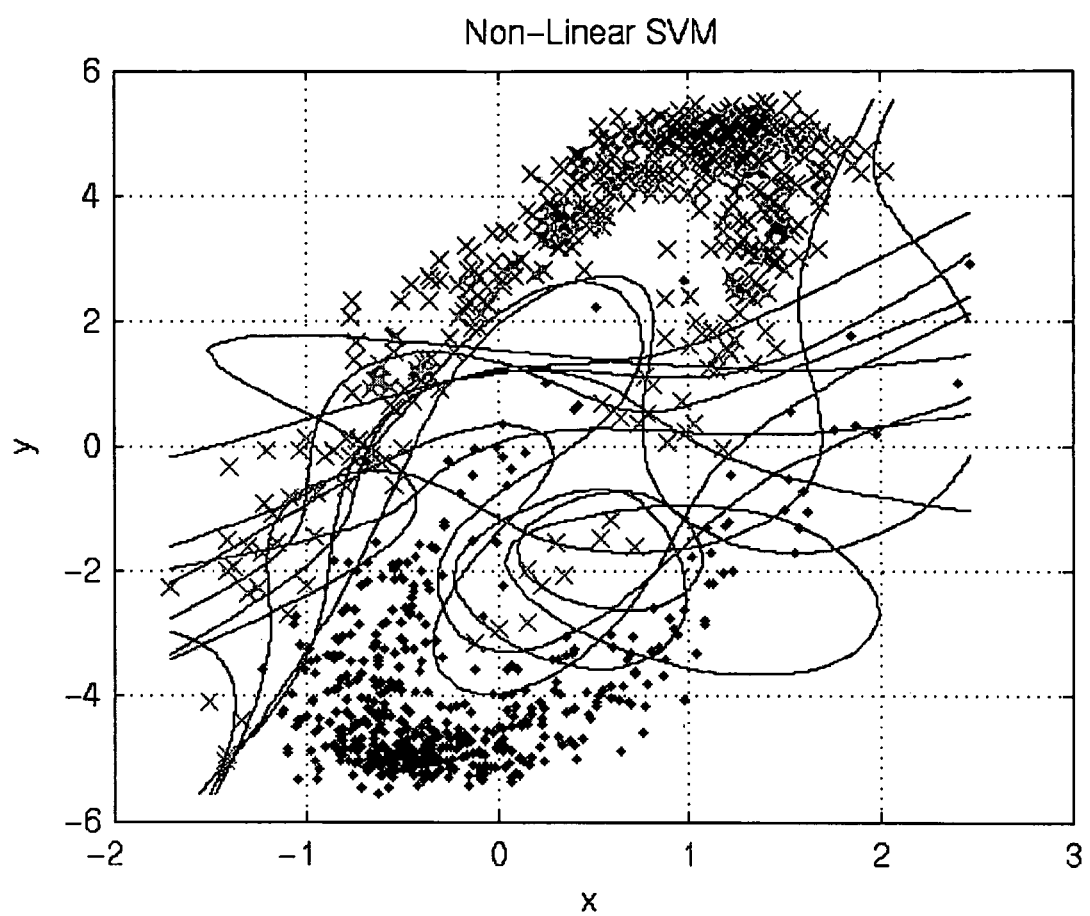
FIG. 7 illustrates solutions for different partitions in accordance with an embodiment of the present invention.
Figure 8:
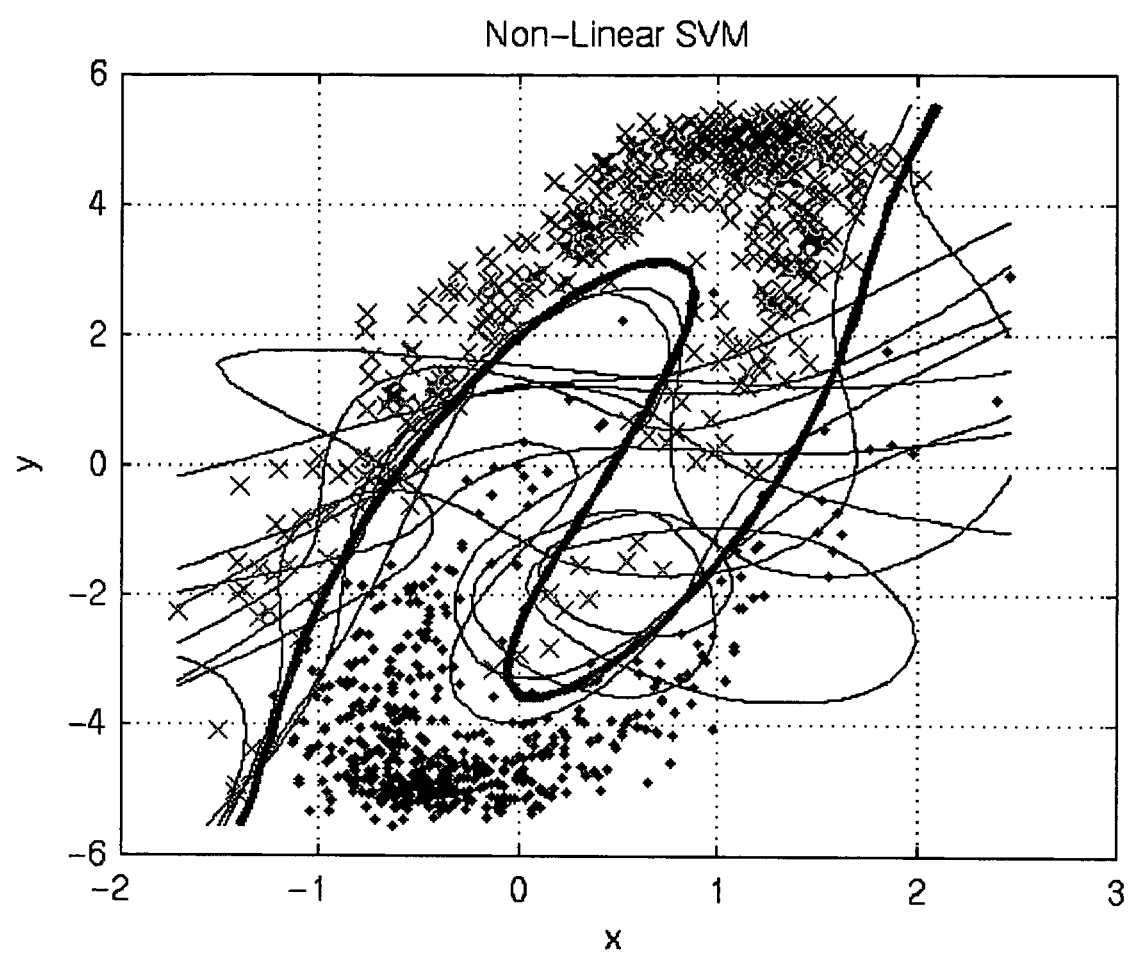
FIG. 8 illustrates solutions for different partitions and a final solution in accordance with an embodiment of the present invention.

If we repeat this process for a total of 12 distinct batches from 12 partitions of the original data, the resulting separation lines are shown in FIG. 7. Clearly, any one of these individual solutions is suboptimal. However, the remarkable feature of this optimal partitioning approach is that once we run a final SVM computation using an agglomeration of the support vectors from the 12 individual batches, we obtain the optimal solution (wide line) that is nearly identical to the original computation that included all the data together (see FIG. 8). The difference is that by using the new SVY partitioning approach taught herein we were able to reduce the memory requirement by 92%. Moreover, by parallelizing the batch runs, we were able to reduce the time required for this analysis by a factor of over 600.

The reason that we are able to achieve highly nonlinear speedup factors is because the computational burden for a SVM problem varies with the number of input vectors raised to the exponent of 2.8. This means that any level of parallelization can yield significant rewards in reducing the overall computational time. Moreover, on machines which are constrained on the total amount of physical memory available, if a problem exhausts the physical memory, the application starts swapping computations to disk. This swapping activity typically slows down the computations by a factor of 1000. Parallelization of the SVM computations helps a problem stay within the constraints of physical memory size and avoid this substantial latency penalty of swapping to disk.

Figure 9:
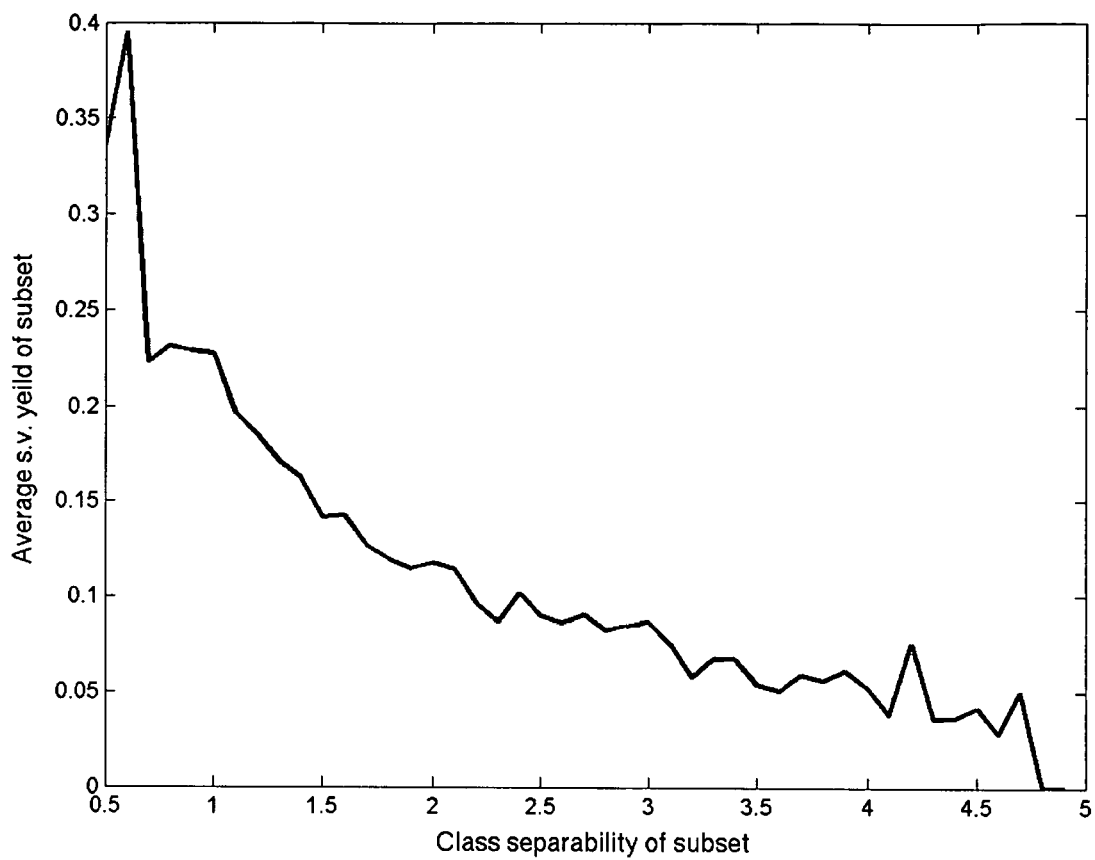
FIG. 9 illustrates average yield versus a class separability measure for the first exemplary application in accordance with an embodiment of the present invention.

Typical dependence of average Support Vector Yield on separability measure J is shown in FIG. 9. Basically, this curve says that the smaller the value of the criterion J, the higher the chances to obtain higher (better) Support Vector Yield. This in turn allows acceleration of the solution (1); or, if there is a fixed-time constraint, to increase the chances of finding an optimal solution for the primal problem (2) in the allotted amount of time.

SECOND EXEMPLARY APPLICATION

Hardware components such as system boards, I/O boards, memory modules, and CPU's can be described as dynamical systems with inputs and outputs. If a disturbance is applied to one or more of the inputs, the response on the outputs can be observed. The dynamics of this Impulse/Response relationship can be captured for what we call a dynamical system characterization of the component, subsystem, or complete system under test.

A dataset of such dynamical Input/Output responses has been generated for a large group of signals associated with CPU's on the systems boards of a high-end server has been prepared. A disturbance has been generated by applying a step voltage change (this action is performed via the system controller's command "margin-voltage".) Dynamic responses for this exercise are observed in the temperature signals associated with the CPU modules on the system boards.

The above dynamical system characterization sequence was applied to a large group of system boards containing known good boards (no faults), and known faulty system boards (containing one or more physical defects). This sequence of dynamics experiments was used to collect a database of Impulse/Response data and label the data as either Good or Faulty. Classification type pattern recognition was now applied to the dynamics signals in an effort to automate the diagnosis of good versus faulty system boards.

Figure 10:
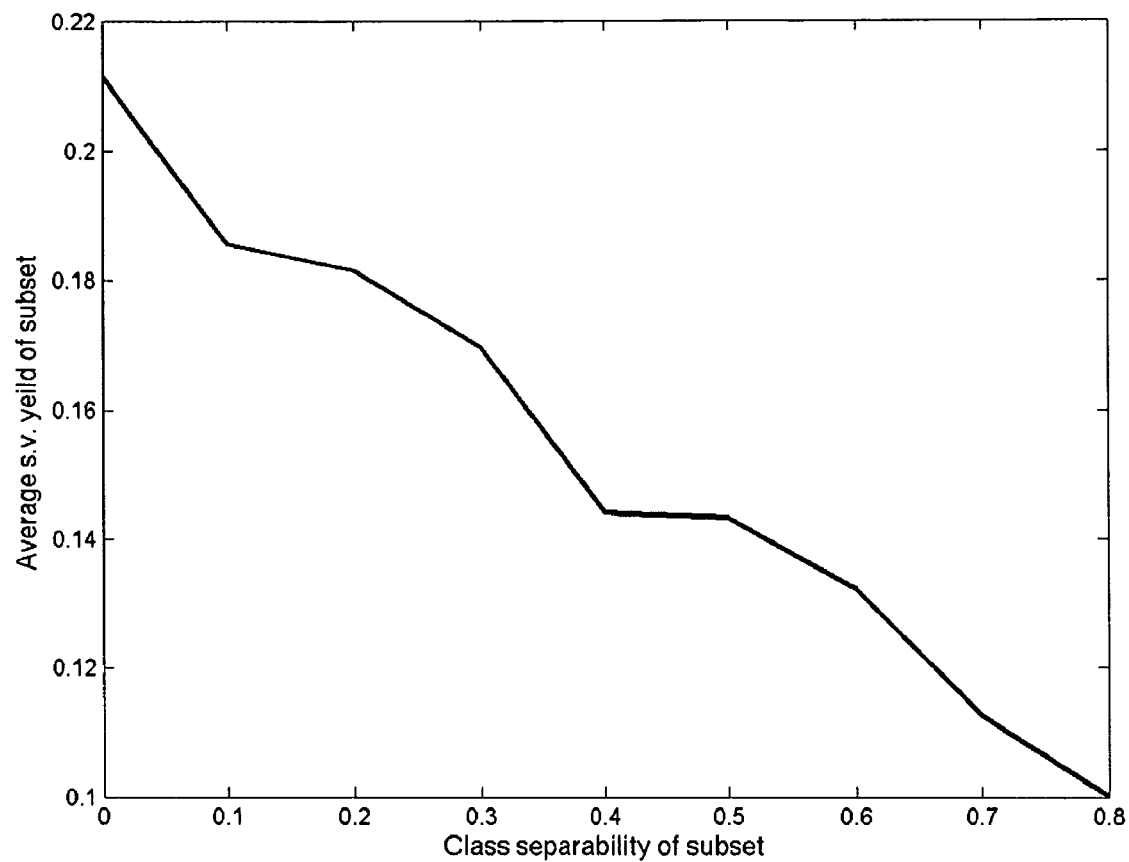
FIG. 10 illustrates average yield versus a class separability measure for the second exemplary application in accordance with an embodiment of the present invention.

As we did in the first exemplary application above, the original classification problem was solved once using the entire database of dynamics signals, and then again by optimal partitioning into sup-problems as our disclosed method prescribes. The class separability measure for all subsets were computed and compared against the support vector yield, which is shown in FIG. 10. The curve indicates that the computable class separability measure very strongly related to the Support Vector Yield (SVY metric) and can be therefore be used as an estimate of the yield for the purpose of selecting optimal subsets in the decomposition of the original problem database.

CONCLUSION

These examples show that this approach is feasible and becomes the key when one confronts a typical life science domain problem where the sizes of datasets are $10^4$ and higher and dimensions can reach $10^6$ (for example, mass spectrometry\peptide data in cancer research). Thus, by estimating the J for various training subsets one can infer that the subsets with smallest values of J give out more support vectors. If J is large, the subset will not contribute many support vectors to the solution and it is not necessary to carry out optimization on this subset.

In summary, the technique described in this disclosure: (1) allows for solution of large classification problems by means of optimal margin classifiers; (2) maximizes the probability of finding the maximum number of support vectors of the original problem; and (3) gives deterministic, quantifiable criteria for training subset partitioning The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed:

1. A method for optimizing subset selection to facilitate parallel training of a support vector machine (SVM), comprising:
    receiving a dataset comprised of data points;
    evaluating the data points to produce a class separability measure;
    using the class separability measure to partition the data points in the dataset into N subsets, wherein the class separability measure J represents the ratio of traces between class scatter matrices $tr(S_B)$; and traces within class scatter matrices $tr(S_W)$;

wherein $$J = \frac{tr(S_B)}{tr(S_W)};$$

using two or more processors in a multiprocessor system in parallel to perform separate SVM training computation for each subset in the N subsets to produce a different set of support vectors for each of the N subsets, wherein each subset contains a separate portion of data points of the entire dataset; and performing a final SVM training computation using an agglomeration of different sets of support vectors computed for each of the N subsets to obtain a substantially optimal solution to the SVM training problem for the entire dataset.

2. The method of claim 1, wherein after the training process is complete, the method further comprises using the SVM (including parameters produced during the training process and the dataset) to classify a second dataset.

3. The method of claim 2, wherein using the SVM to classify the second dataset involves:
    using a kernel function to map the second dataset from a low-dimensional input space to a higher-dimensional feature space; and
    performing a quadratic optimization operation, which generates a substantially optimal decision surface in the feature space, wherein the decision surface classifies vectors in the second dataset.

4. The method of claim 1, wherein the number of traces between class scatter matrices, $tr(S_B)$, is calculated as follows, $$tr(S_B^\Phi) = \sum_{i=1}^{c} n_i \left[ \frac{\text{Sum}(K_{D_i,D_i})}{n_i^2} - 2\frac{\text{Sum}(K_{D_i,D})}{n_i n} + \frac{(K_{D,D})}{n^2} \right],$$

wherein D represents the dataset, $D_i$ represents batch i of D, K represents a kernel matrix, n is the size of the dataset D, and $n_i$ is the size of batch i.

5. The method of claim 1, wherein the number of traces within class scatter matrices, $tr(S_W)$, is calculated as follows, $$tr(S_W^\Phi) = \sum_{i=1}^{c} \sum_{j=1}^{n_i} \left[ K(x_{i,j}, x_{i,j}) - 2\frac{\text{Sum}(K_{D_i,D_i})}{n_i} \right],$$

wherein D represents the dataset, $D_i$ represents batch i of D, K represents a kernel matrix, n is the size of the dataset D, and $n_i$ is the size of batch i.

6. The method of claim 1, wherein the class separability measure J is correlated with a support vector yield (SVY), which is the ratio of the number of: support vectors in a sub-problem solution that are in the solution of the original problem; and the number of support vectors in the solution of the original problem.

7. A computer-readable storage medium storing instructions that when executed by a computer cause the computer to perform a method for optimizing subset selection to facilitate parallel training of a support vector machine (SVM), the method comprising:

receiving a dataset comprised of data points;

evaluating the data points to produce a class separability measure;

using the class separability measure to partition the data points in the dataset into N subsets, wherein the class separability measure J represents the ratio of traces between class scatter matrices tr($S_B$); and traces within class scatter matrices tr($S_W$);

wherein $$J = \frac{tr(S_B)}{tr(S_W)};$$

using two or more processors in a multiprocessor system in parallel to perform separate SVM training computation for each subset in the N subsets to produce a different set of support vectors for each of the N subsets wherein each subset contains a separate portion of data points of the entire dataset; and performing a final SVM training computation using an agglomeration of different sets of support vectors computed for each of the N subsets to obtain a substantially optimal solution to the SVM training problem for the entire dataset.

8. The computer-readable storage medium of claim 7, wherein after the training process is complete, the method further comprises using the SVM (including parameters produced during the training process and the dataset) to classify a second dataset.

9. The computer-readable storage medium of claim 8, wherein using the SVM to classify the second dataset involves:

using a kernel function to map the second dataset from a low-dimensional input space to a higher-dimensional feature space; and performing a quadratic optimization operation, which generates a substantially optimal decision surface in the feature space, wherein the decision surface classifies vectors in the second dataset.

10. The computer-readable storage medium of claim 7, wherein the number of traces between class scatter matrices, tr($S_B$), is calculated as follows, $$tr(S_B^\Phi) = \sum_{i=1}^{c} n_i \left[ \frac{\text{Sum}(K_{D_i,D_i})}{n_i^2} - 2\frac{\text{Sum}(K_{D_i,D})}{n_i n} + \frac{(K_{D,D})}{n^2} \right],$$

wherein D represents the dataset, $D_i$ represents batch i of D, K represents a kernel matrix, n is the size of the dataset D, and $n_i$ is the size of batch i.

11. The computer-readable storage medium of claim 7, wherein the number of traces within class scatter matrices, tr($S_W$), is calculated as follows, $$tr(S_W^\Phi) = \sum_{i=1}^{c} \sum_{j=1}^{n_i} \left[ K(x_{i,j}, x_{i,j}) - 2\frac{\text{Sum}(K_{D_i,D_i})}{n_i} \right],$$

wherein D represents the dataset, $D_i$ represents batch i of D, K represents a kernel matrix, n is the size of the dataset D, and $n_i$ is the size of batch i.

12. The computer-readable storage medium of claim 7, wherein the class separability measure J is correlated with a support vector yield (SVY), which is the ratio of the number of: support vectors in a sub-problem solution that are in the solution of the original problem; and the number of support vectors in the solution of the original problem.

13. An apparatus that optimizes subset selection to facilitate parallel training of a support vector machine (SVM), comprising:

a receiving mechanism configured to receive a dataset comprised of data points;

an evaluation mechanism configured to evaluate the data points to produce a class separability measure;

a partitioning mechanism configured to use the class separability measure to partition the data points in the dataset into N subsets, wherein the class separability measure J represents the ratio of traces between class scatter matrices tr($S_B$); and traces within class scatter matrices tr($S_W$);

whereby $$J = \frac{tr(S_B)}{tr(S_W)};$$

and a training mechanism configured to use two or more processors in parallel to perform separate SVM training computation for each subset in the N subsets to produce a different set of support vectors for each of the N subsets wherein each subset contains a separate portion of data points of the entire dataset;

wherein the training mechanism is additionally configured to perform a final SVM training computation using an agglomeration of different sets of support vectors computed for each of the N subsets to obtain a substantially optimal solution to the SVM training problem for the entire dataset.

14. The apparatus of claim 13, further comprising a classification mechanism, wherein after the training process is complete, the classification mechanism is configured to use the SVM (including parameters produced during the training process and the dataset) to classify a second dataset.

15. The apparatus of claim 14, wherein while using the SVM to classify the second dataset, the classification mechanism is configured to:

use a kernel function to map the second dataset from a low-dimensional input space to a higher-dimensional feature space; and to perform a quadratic optimization operation, which generates a substantially optimal decision surface in the feature space, wherein the decision surface classifies vectors in the second dataset.

16. The apparatus of claim 13, wherein the evaluation mechanism is configured to calculate the number of traces between class scatter matrices, $tr(S_B)$, as follows, $$tr(S_B^\Phi) = \sum_{i=1}^{c} n_i \left[ \frac{\text{Sum}(K_{D_i,D_i})}{n_i^2} - 2\frac{\text{Sum}(K_{D_i,D})}{n_i n} + \frac{(K_{D,D})}{n^2} \right],$$

wherein D represents the dataset, $D_i$ represents batch i of D, K represents a kernel matrix, n is the size of the dataset D, and $n_i$ is the size of batch i.

17. The apparatus of claim 13, wherein the evaluation mechanism is configured to calculate the number of traces within class scatter matrices, $tr(S_W)$, as follows, $$tr(S_W^\Phi) = \sum_{i=1}^{c} \sum_{j=1}^{n_i} \left[ K(x_{i,j}, x_{i,j}) - 2\frac{\text{Sum}(K_{D_i,D_i})}{n_i} \right],$$

wherein D represents the dataset, $D_i$ represents batch i of D, K represents a kernel matrix, n is the size of the dataset D, and $n_i$ is the size of batch i.

* * * * *